United States Patent
Zusman et al.

(10) Patent No.: US 8,640,545 B2
(45) Date of Patent: Feb. 4, 2014

(54) VIBRATION SENSOR WITH MECHANICAL ISOLATION MEMBER

(75) Inventors: George Zusman, Houston, TX (US); David A. Corelli, East Aurora, NY (US)

(73) Assignee: PCB Piezotronics, Inc., Depew, NY (US)

( * ) Notice: Subject to any disclaimer, the term of this patent is extended or adjusted under 35 U.S.C. 154(b) by 449 days.

(21) Appl. No.: 12/898,240

(22) Filed: Oct. 5, 2010

(65) Prior Publication Data

US 2011/0079084 A1    Apr. 7, 2011

Related U.S. Application Data

(60) Provisional application No. 61/248,846, filed on Oct. 5, 2009.

(51) Int. Cl.
*G01M 13/00*    (2006.01)

(52) U.S. Cl.
USPC .............................................. 73/660; 73/649

(58) Field of Classification Search
USPC ............... 73/660, 575, 584, 593, 649, 865.6; 702/183, 188, 189
See application file for complete search history.

(56) References Cited

U.S. PATENT DOCUMENTS

| | | | |
|---|---|---|---|
| 4,328,442 A | 5/1982 | Tanaka et al. | |
| 4,966,031 A | 10/1990 | Mochizuki | |
| 5,009,450 A | 4/1991 | Herberg et al. | |
| 5,218,870 A | 6/1993 | Komurasaki et al. | |
| 5,873,559 A | 2/1999 | von Flotow et al. | |
| 5,907,491 A | 5/1999 | Canada et al. | |
| 5,942,103 A * | 8/1999 | Wang et al. | 205/787 |
| 6,330,525 B1 * | 12/2001 | Hays et al. | 702/183 |
| 6,553,336 B1 * | 4/2003 | Johnson et al. | 702/188 |
| 6,578,682 B2 * | 6/2003 | Braman et al. | 188/378 |
| 6,598,479 B1 | 7/2003 | Robinson et al. | |
| 6,763,694 B1 | 7/2004 | Boulton et al. | |
| 6,886,929 B2 | 5/2005 | Malik et al. | |
| 6,957,564 B2 * | 10/2005 | Nelson et al. | 73/23.31 |
| 7,017,424 B2 | 3/2006 | Rieder et al. | |
| 7,066,038 B2 * | 6/2006 | Moir et al. | 73/865.6 |
| 7,353,717 B2 | 4/2008 | Rieder et al. | |
| 7,424,403 B2 * | 9/2008 | Robinson et al. | 702/189 |
| 7,484,416 B1 * | 2/2009 | Klosinski et al. | 73/718 |
| 7,493,995 B2 | 2/2009 | Sas et al. | |
| 7,544,910 B2 | 6/2009 | Peng | |
| 7,565,840 B2 | 7/2009 | Watanabe | |
| 7,586,236 B2 | 9/2009 | Corsaro et al. | |
| 8,126,574 B2 * | 2/2012 | Discenzo et al. | 700/28 |
| 8,196,455 B2 * | 6/2012 | Anderson et al. | 73/61.49 |
| 8,196,464 B2 * | 6/2012 | Kirk et al. | 73/168 |
| 2008/0156961 A1 * | 7/2008 | Finkenbinder | 248/610 |
| 2011/0126630 A1 * | 6/2011 | Fraanje et al. | 73/654 |

OTHER PUBLICATIONS

Pruftechnik AG, "smartSCANNER—The handy maintenance partner," www.pruftechnik.com, printed in Germany, 2003.
Pruftechnik AG, "VIBSCANNER—Data collection & machine diagnostics," www.pruftechnik.com, printed in Germany, 2002.
Pruftechnik AG, "VIBROTIP—Machine condition trending data collector," http://www.powertech-rentals.com.au/ equipment/mechanical/pruftechnik-vibrotip-vibr, printed in Germany, 2001.

* cited by examiner

*Primary Examiner* — J M Saint Surin
(74) *Attorney, Agent, or Firm* — Phillips Lytle LLP

(57) ABSTRACT

An apparatus and system for sensing vibration in rotary or reciprocating machinery, such as motors, pumps, fans, gearboxes, compressors, turbo-machinery or high-speed spindles, which comprises a mechanical isolation member (14) interposed between a sensor base (15) and a main sensor body (11). In one aspect, the mechanical isolation member comprises a coaxial cylinder of plastic, rubber or polyurethane which is compressed between the sensor base and main sensor body.

25 Claims, 18 Drawing Sheets

| Marker | REF | 1 | 2 |
|---|---|---|---|
| FREQ (Hz) | 1400.00 | 19600.00 | 4000.00 |
| % DEV | -3.425 | 352.830 | -4.204 |
| MAG (dB) | -0.303 | 13.119 | -0.373 |

*Data Points*

| Frequency (Hz) | Dev. (%) | Frequency (Hz) | Dev. (%) | Frequency (Hz) | Dev. (%) |
|---|---|---|---|---|---|
| 10.0 | 1.9 | 300.0 | -1.2 | 7000.0 | -7.9 |
| 15.0 | 1.9 | 500.0 | -1.7 | 10000.0 | -5.9 |
| 30.0 | 1.4 | 1000.0 | -2.4 | 13000.0 | 3.1 |
| 50.0 | 0.6 | 3000.0 | -5.5 | 15000.0 | 16.0 |
| REF. FREQ. | 0.0 | 5000.0 | -7.2 | | |

SECTION A-A

SECTION A-A

VIBRATION SENSOR WITH MECHANICAL ISOLATION MEMBER

PRIORITY CLAIM

The present application claims priority to U.S. Provisional Patent Application No. 61/248,846, filed Oct. 5, 2009.

TECHNICAL FIELD

The present invention relates generally to a vibration sensor for use with machines such as rotary and reciprocating machinery, for example.

BRIEF SUMMARY OF THE INVENTION

With parenthetical reference to the corresponding parts, portions or surfaces of the disclosed embodiment, merely for purposes of illustration and not by way of limitation, the present invention provides an apparatus and system for sensing vibration which comprises a mechanical isolation member (14) interposed between a sensor base (15) and a main sensor body (11). In one aspect of the invention, the apparatus and system is mounted on or attached to a rotary or reciprocating machine such as a motor or pump. In one aspect, the apparatus and system is configured to sense and measure vibration in rotary and reciprocating machinery. In another aspect, the apparatus and system detects vibrations which may be symptomatic of machine failure. In yet another aspect, the apparatus and system produces a relatively high frequency response.

In another aspect of the invention, raw vibrations or vibration analyzing results may be transmitted in the form of an electrical signal by cable or wirelessly (e.g. by radio channel). In another aspect, the vibration sensor produces an output signal which may be transferred by cable or wirelessly for machinery trending and protection, for example. In another aspect of the invention, this electrical signal may be transmitted to and received by an external trending device and logic solver configured to determine whether or not an associated machine should be powered down or analyzed by portable diagnostics devices, for example.

In another aspect, mechanical vibration is transformed into an electrical signal that passes a buffered output directly after filtering and transformation to one or several parameters such as peak of acceleration, root mean square of velocity, peak to peak displacement, etc. The raw signal(s) or parameter(s) may be communicated to an external computer, for example, a logic solver such as a programmable logic controller (PLC) or distributed control system (DCS) by wire (cable) or wirelessly. In one aspect, an external logic solver compares the signals to preset/predetermined levels of acceptable machinery vibration level. If a vibration level is below the preset/predetermined acceptable level, then the vibration level may be disregarded as not dangerous. However, if the vibration level is at or above the acceptable level, then the machine may be experiencing harmful mechanical events, and may be analyzed deeper by special analyzing devices, or shutdown for appropriate maintenance.

In other aspects of the invention, a vibration sensor and system is provided which comprises a sensor base adapted for mounting on a machine, such as a motor, pump or fan, or high speed equipment such as gearboxes, compressors, turbo-machinery or high-speed spindles, wherein the sensor base has a sensitive element for measuring vibration of such a machine; a main sensor body; a mechanical isolation member interposed between the sensor base and main sensor body, arranged such that the sensor base in not in direct contact with the main sensor body; and an electrical assembly within the main sensor body for processing machine vibration. In one aspect, the mechanical isolation member is screwed to the sensor base with a nut and washer, compressing the mechanical isolation member and providing a relatively high cross axis stiffness. In other aspects, the vibration sensor is operable in a relatively high working frequency range, such as 10 kHz to 20 kHz.

A vibration sensing system is disclosed which comprises in one embodiment a sensor base adapted for mounting on a machine, a main sensor body, and a mechanical isolation member interposed between the sensor base and main sensor body; and further comprises an electrical assembly within the main sensor body for processing measured vibrations of a machine; and a transmission element within the main sensor body for transmission of information respecting the measured vibration. Other aspects of the invention include an adapter cable assembly comprising an electrical conductor configured for communication between a connector associated with the main sensor body and an external data collector. In other aspects, the invention includes an antenna configured for wireless transmission of information respecting the measured vibration wherein the antenna is within the main sensor body, and the main sensor body comprises a plastic cap.

DESCRIPTION OF THE PREFERRED EMBODIMENTS

Figure 1:
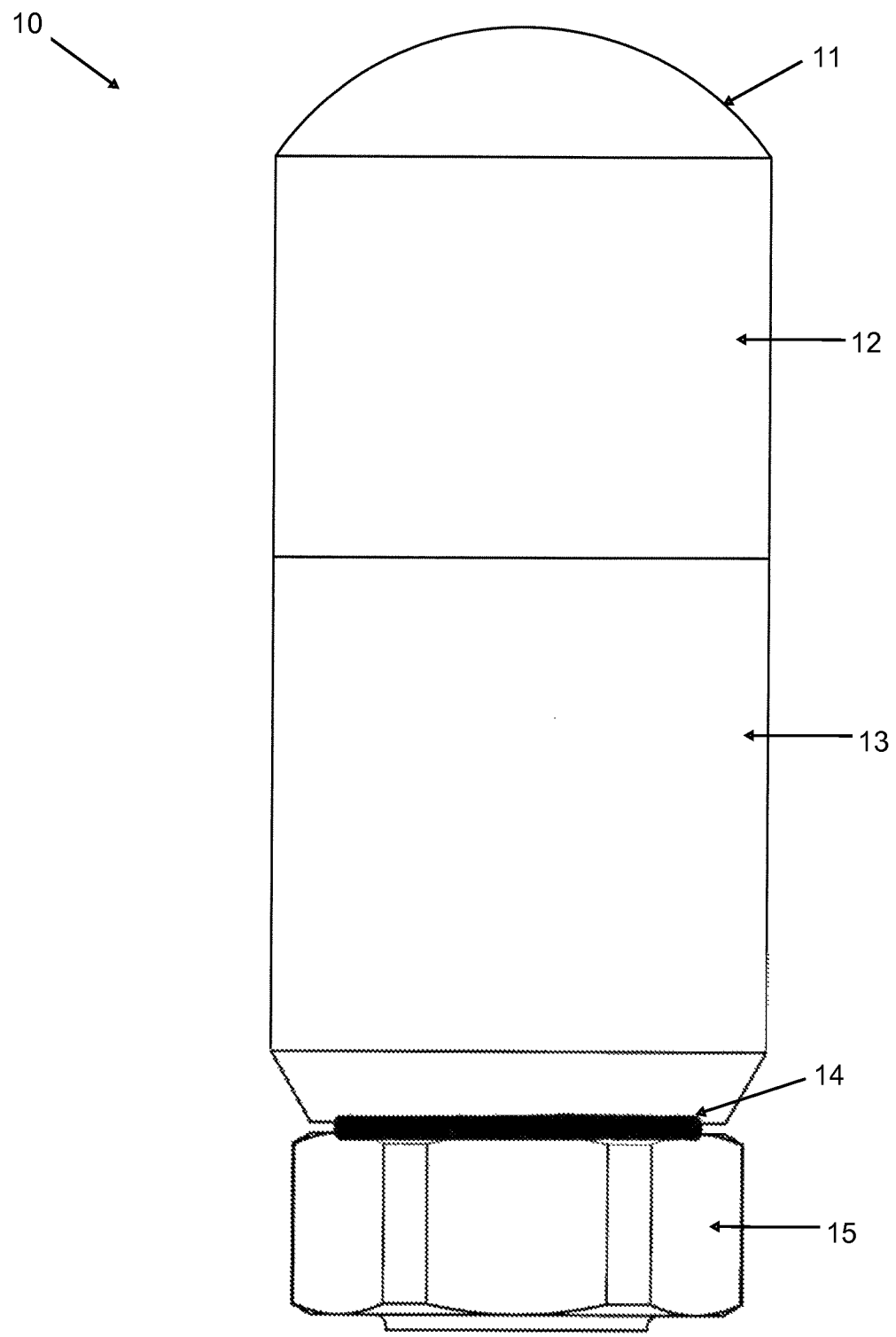
FIG. 1 is a front view of an embodiment of a vibration sensor.

At the outset, it should be clearly understood that like reference numerals are intended to identify the same parts, elements or portions consistently throughout the several drawing figures, as such parts, elements or portions may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal," "vertical," "left," "right," "up" and "down," as well as adjectival and adverbial derivatives thereof (e.g., "horizontally," "rightwardly," "upwardly," etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. The following description of the preferred embodiments of the present invention are exemplary in nature and are not intended to restrict the scope of the present invention, the manner in which the various aspects of the invention may be implemented, or their applications or uses.

Figure 2:
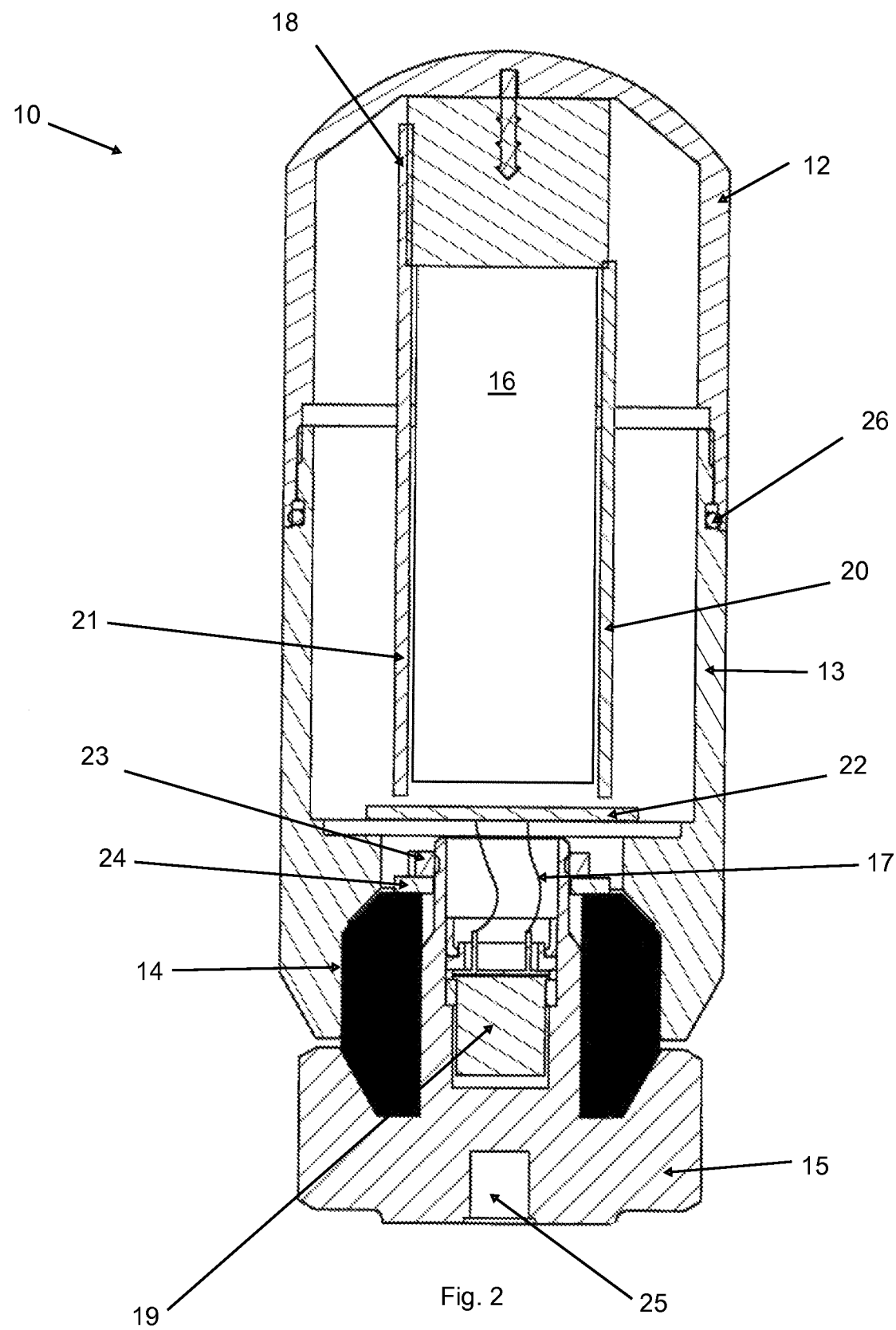
FIG. 2 is a cross-sectional view of the embodiment illustrated in FIG. 1

Referring now to FIGS. 1 and 2, a vibration sensor in one embodiment resides in an assembly 10 which is configured for attachment to a monitored machine. The vibration sensor assembly 10 includes a sensor body 11 (which may be comprised of metal, for example), having an upper portion 12 or cap and a lower portion 13, a mechanical isolation member 14 (which may be comprised of plastic, rubber or polyurethane, for example) and a sensor base 15 (which may be comprised of metal, for example). A silicon sealing ring 25 may be used to improve the seal between the lower 13 and upper portions 12 of the main sensor body 11.

In this embodiment, the main sensor body 11 and sensor base 15 in FIG. 1 are not in direct contact with each other, but are attached or connected or engaged through the mechanical isolation member 14. The mechanical isolation member 14 may be compressed by a nut 23 and washer 24 assembled on the sensor base 15, as shown in FIG. 2. Attachment to a machine may, for example, be effected by use of a threaded connection 25 in a sensor base 15.

The mechanical isolation member 14 in one embodiment is of a form similar to a coaxial cylinder. The illustrated means of mounting the mechanical isolation member provides a reduction of the cross axis sensitivity of the complete vibration sensor assembly 10. In one embodiment, cross axis stiffness (horizontal) was measured at about 27800 LBF/inch inside an assembled vibration sensor, compared to cross axis stiffness of about 6800 LBF/inch in a free, unassembled mechanical isolation member. In one embodiment, the vibration sensor utilizes a mechanical isolation member with a natural frequency of about 700 Hz to 1300 Hz and fraction of critical damping in a range of about 0.05 to 0.5.

The sensor sensitivity element 19, which may comprise a piezoelectric crystal (such as PCB Piezotronics Series 66 [e.g. Model 66-21-3L-PZ-1]) or MEM structure (such as PCB Piezotronics 3501A1220KG), is placed directly upon the sensor base 15 and may be kept in position by compression or glue or other suitable means.

Figure 3:
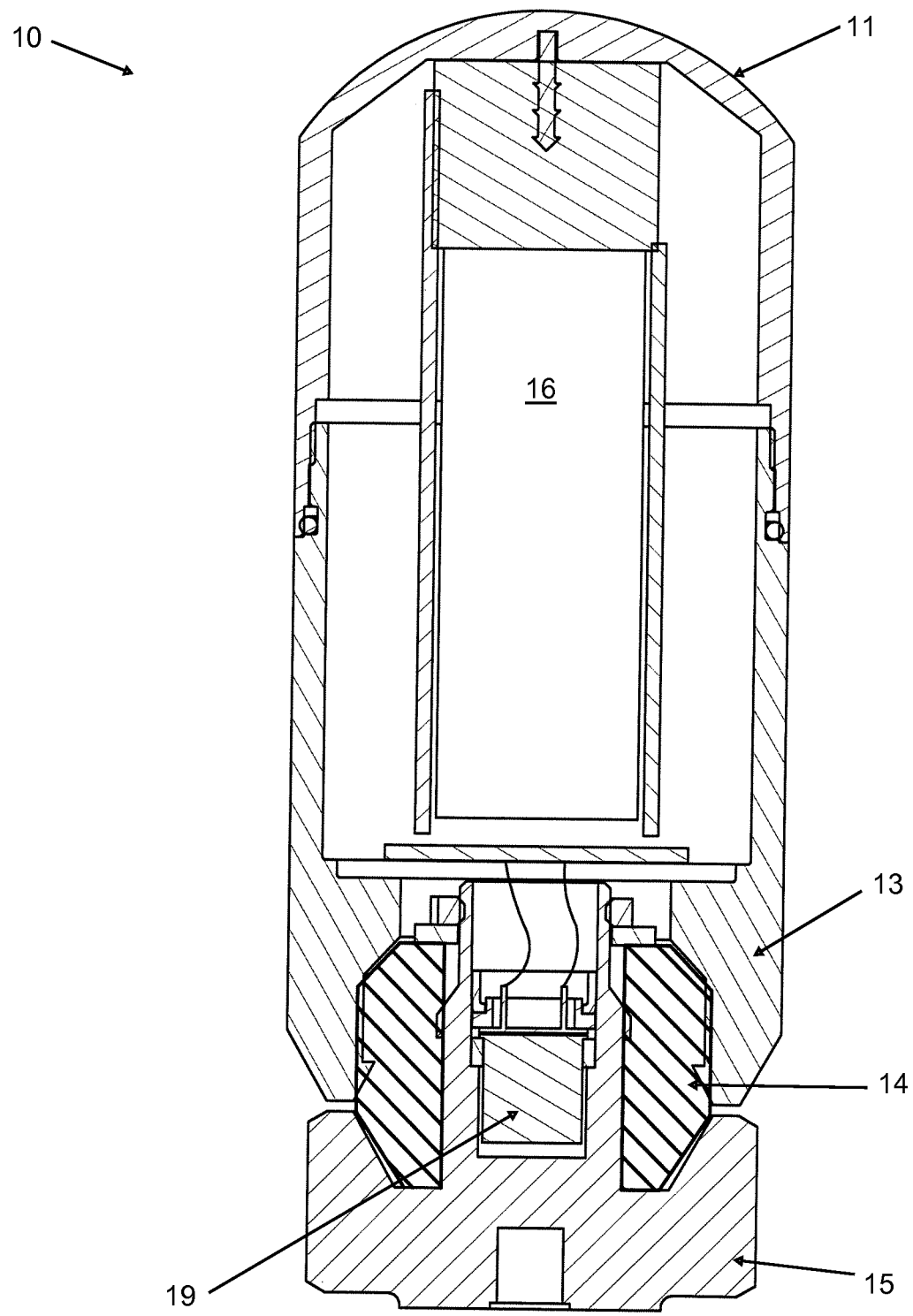
FIG. 3 is a second cross-sectional view of the embodiment illustrated in FIG. 1.

FIG. 3 is another cross-sectional drawing which further shows the configuration of the mechanical isolation member 14 and its placement and arrangement between the main body portion 11 and sensor base 15.

In the embodiment illustrated in FIGS. 2 and 3, electronics located at 20, 21, 22 (e.g. analog circuit(s), microprocessor(s), radio, battery package—and/or other application dependent components), together with a battery or battery package 16, electrically connect to the sensitive element 19 by soft wires 17.

Figure 16:
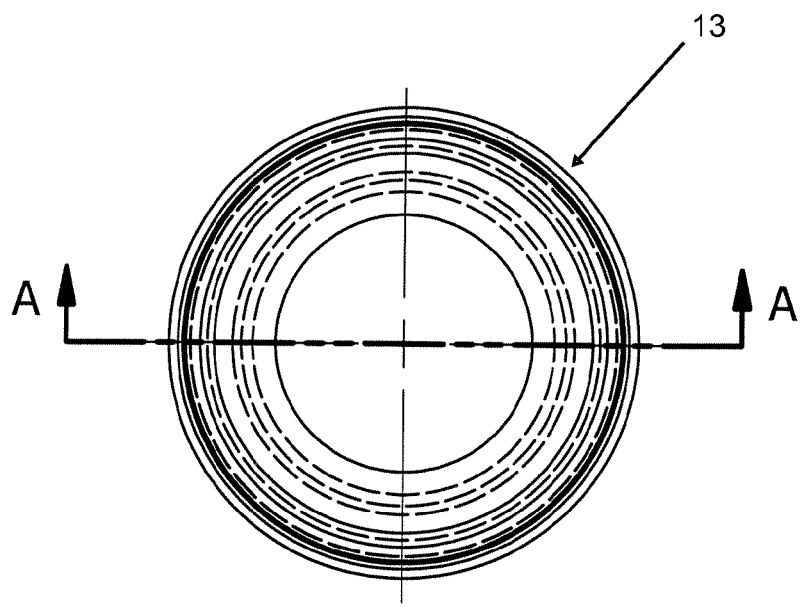
FIG. 16 is a cross-sectional top view of a portion of a main sensor body.
Figure 17:
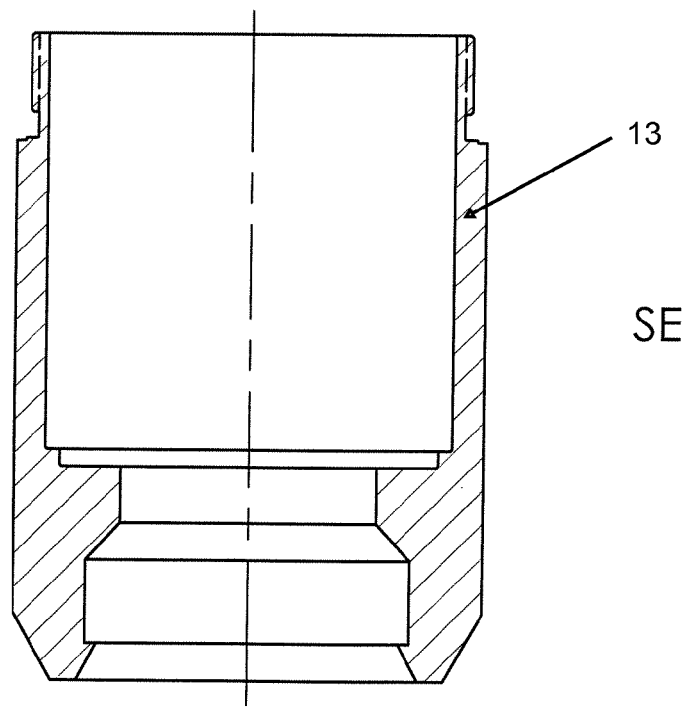
FIG. 17 is a cross-sectional front view of a portion of the main sensor body.
Figure 18:
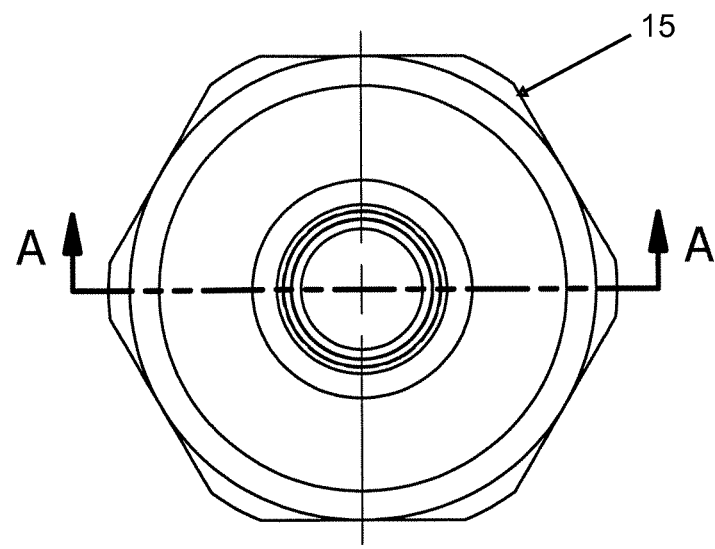
FIG. 18 is a top view of a sensor base.
Figure 19:
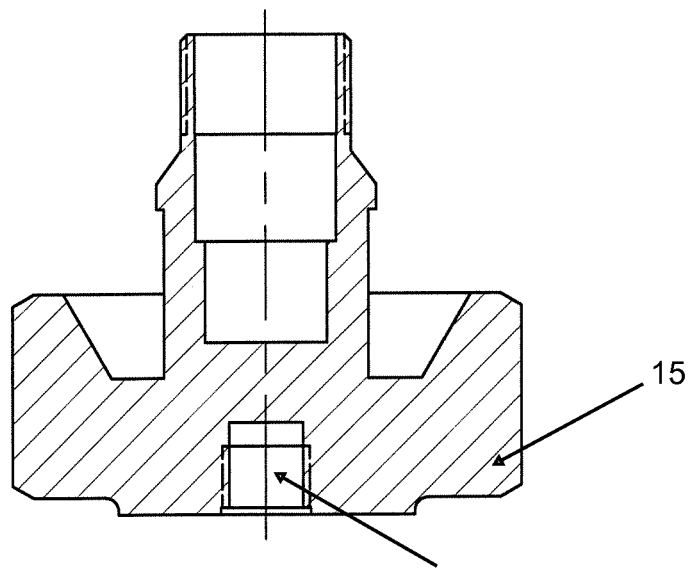
FIG. 19 is a cross-sectional front view of a sensor base.
Figure 20:
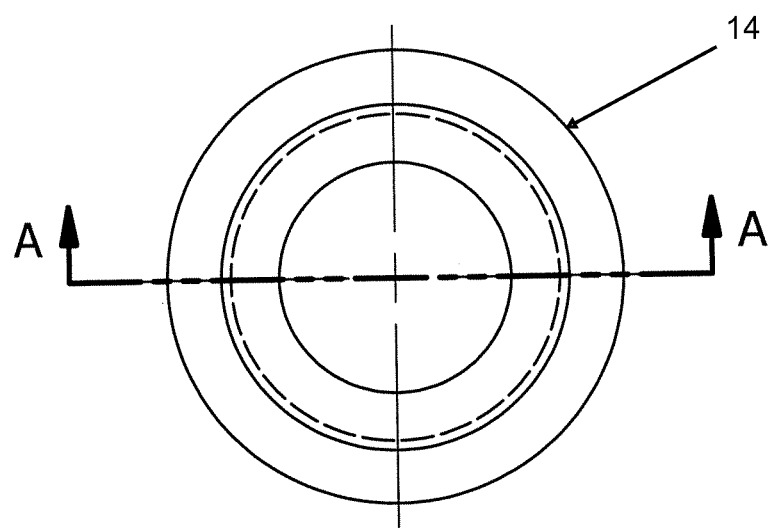
FIG. 20 is a top view of a mechanical isolation member.
Figure 21:
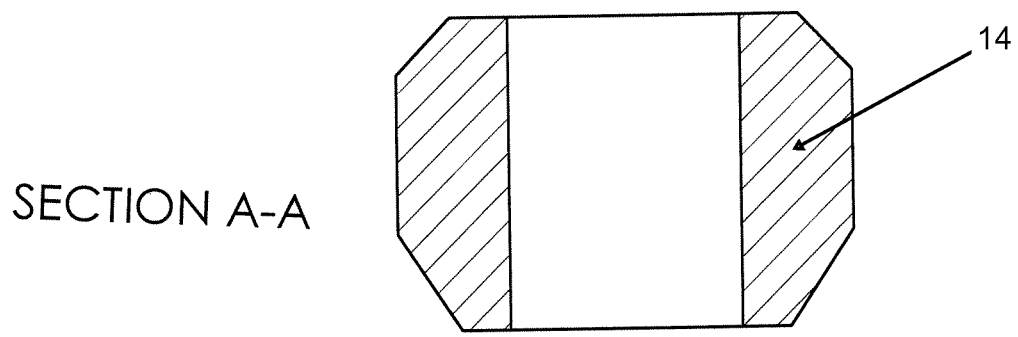
FIG. 21 is a cross-sectional front view of a mechanical isolation member.

FIGS. 16 and 17 illustrate one embodiment of a lower portion 13 of the main body portion 11. FIGS. 18 and 19 illustrate a top view and cross-sectional view, respectively, of one embodiment of a sensor base 15 before attachment of a mechanical isolation member. FIGS. 20 and 21 illustrate a top view and cross-sectional view, respectively, of one embodiment of a mechanical isolation member 14.

Figure 22:
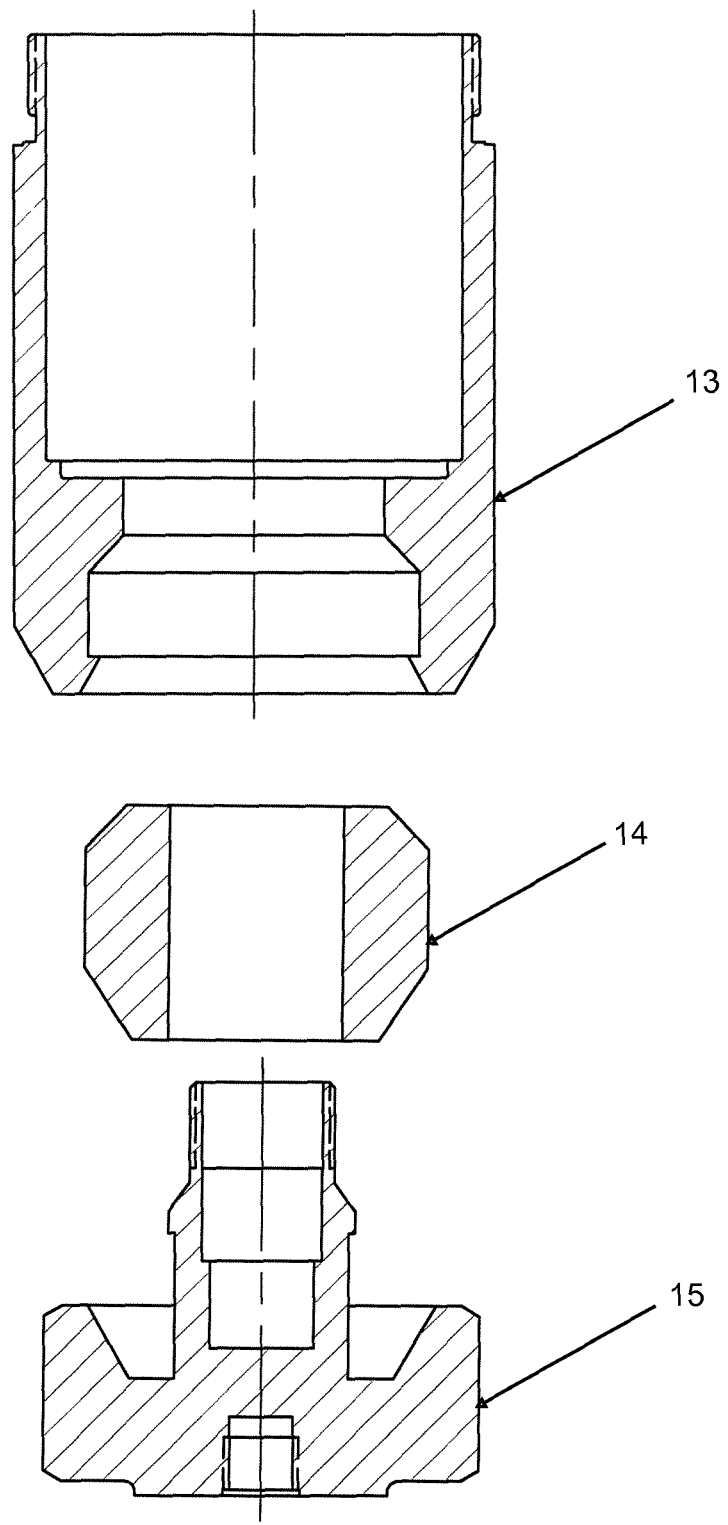
FIG. 22 is a cross-sectional front view of a portion of a main sensor body, a mechanical isolation member and a sensor base of one embodiment of the vibration sensor.
Figure 23:
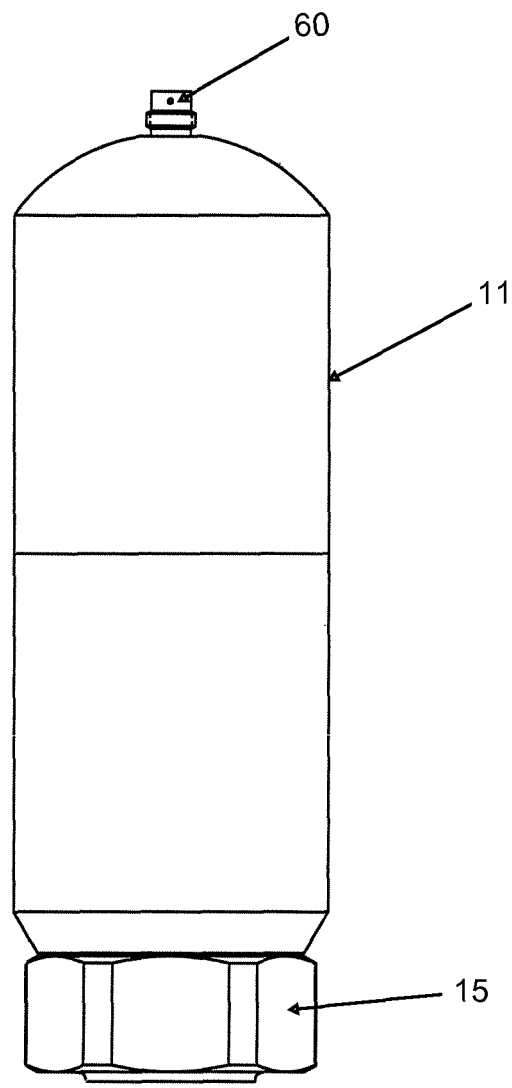
FIG. 23 is a front view of an embodiment of a vibration sensor having a shorting connector.

Referring now to FIG. 22, a sensor base 15 is depicted together with a partial sensor housing 13, with a mechanical isolation member 14 interposed between. FIG. 23 illustrates a sensor base 15 and sensor housing 11 with a shorting connector 60 attached or connected to the upper portion of the housing. The shorting connector may protect the connector and may connect to/plug in a data collector.

Figure 26:
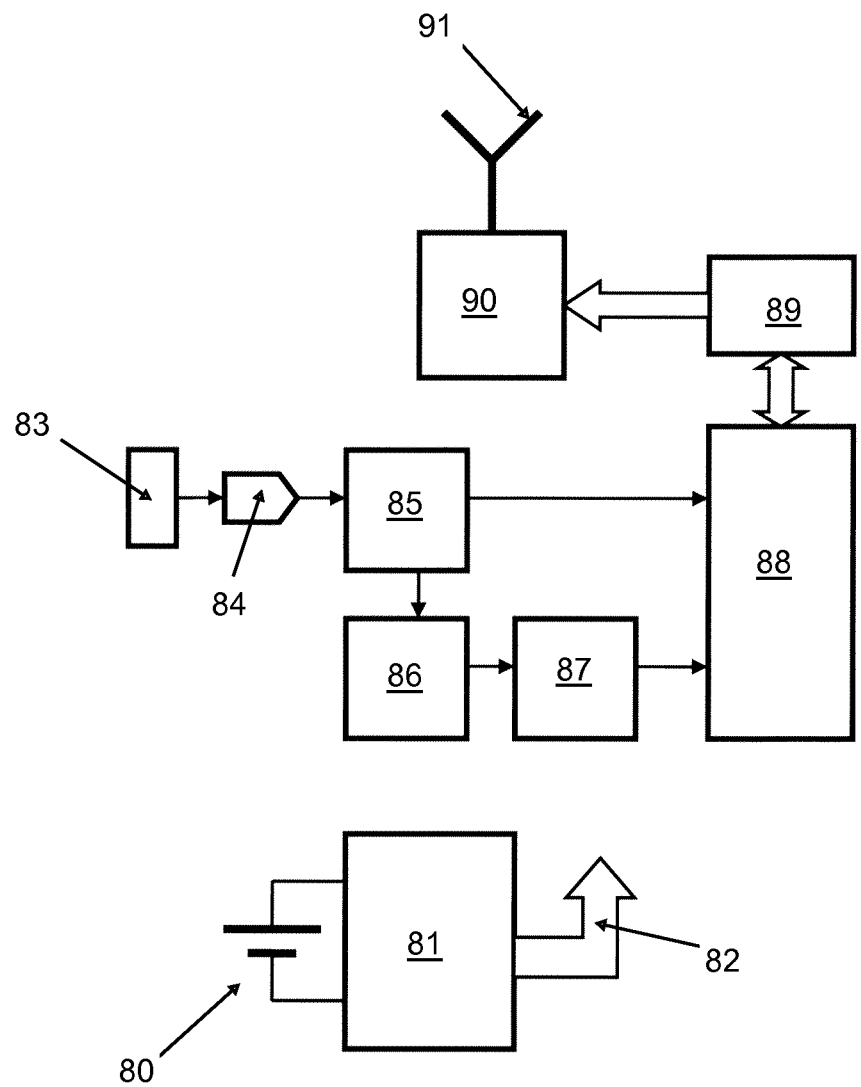
FIG. 26 is a schematic diagram of the electronics in one embodiment of the vibration sensor.

System electronics for one embodiment is shown in the schematic diagram in FIG. 26. In FIG. 26, a battery 80 and power supply 81 are illustrated which supply power (represented by the arrow 82) to the system. The signal from an accelerometer 83 passes through an amplifier 84 and an acceleration filter 85. A velocity filter 86 is provided in series with an integrator 87 with output directed to a digital signal processor or microprocessor 88 known to those skilled in the art. An antenna 91 connected to a radio transmitter 90 and controller 89 are also provided in one embodiment of the invention.

The transfer of the vibration signal between the sensor assembly 10 and external devices (e.g. computer) or logic may be via wireless communication. In one embodiment, the main sensor body includes a connector 60 or wireless radio channel by which the sensor may communicate to an external computer or device (for example, a logic solver system such as Siemens S7-400, GE Fanuc Logic Master Series Six or AB Rockwell SLC500). An antenna 18 and plastic cap 12 may be used to provide such wireless communication. Another means of communication channel is connector and cable. In such an embodiment, a battery/battery package is not necessarily included.

Figure 4:
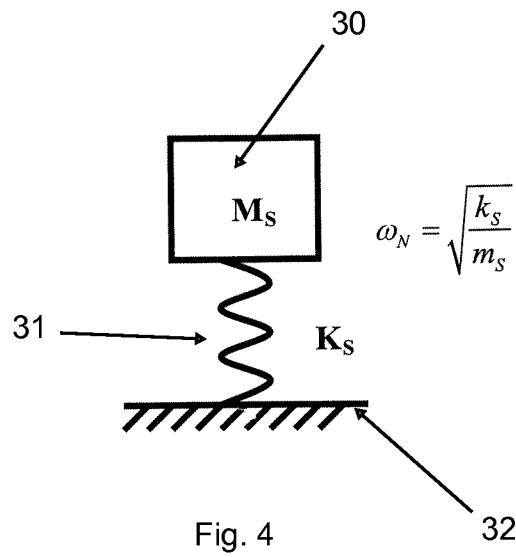
FIG. 4 is a schematic drawing of a model one mass-spring system.
Figure 5:
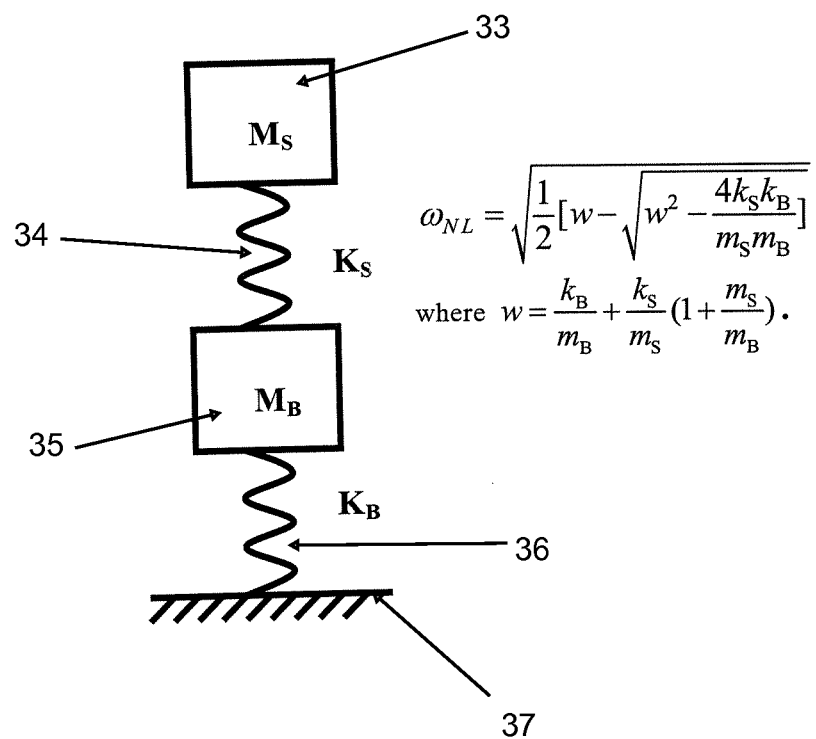
FIG. 5 is a schematic drawing of a model two mass-spring system.

FIG. 4 illustrates a spring-mass model representing a sensitive element 30 mechanically connected by a junction 31 to a surface 32. FIG. 5 is a spring-mass model representing a sensitive element 33 mechanically connected by a junction 34 to a sensor body 35, which is mechanically connected to machinery surface 37 by junction 36.

Figure 6:
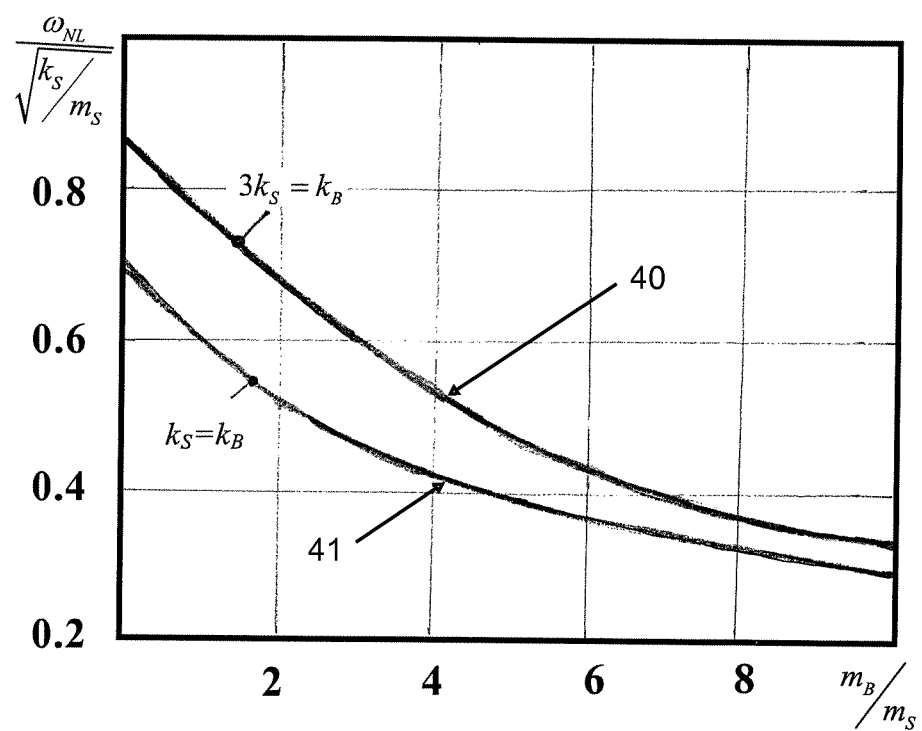
FIG. 6 is a diagram which illustrates the changes of normalized natural frequency in a two mass-spring system vs. mass of body and sensitive element in a base ratio.
Figure 7:
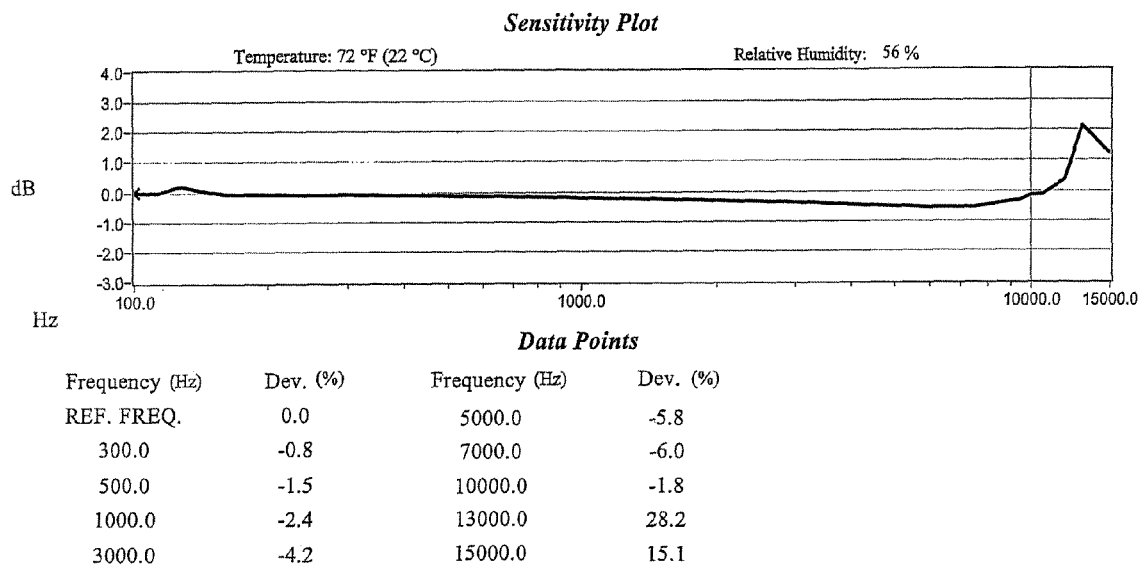
FIG. 7 is an example of frequency response of a prior art sensor base with sensitive element alone.
Figure 8:
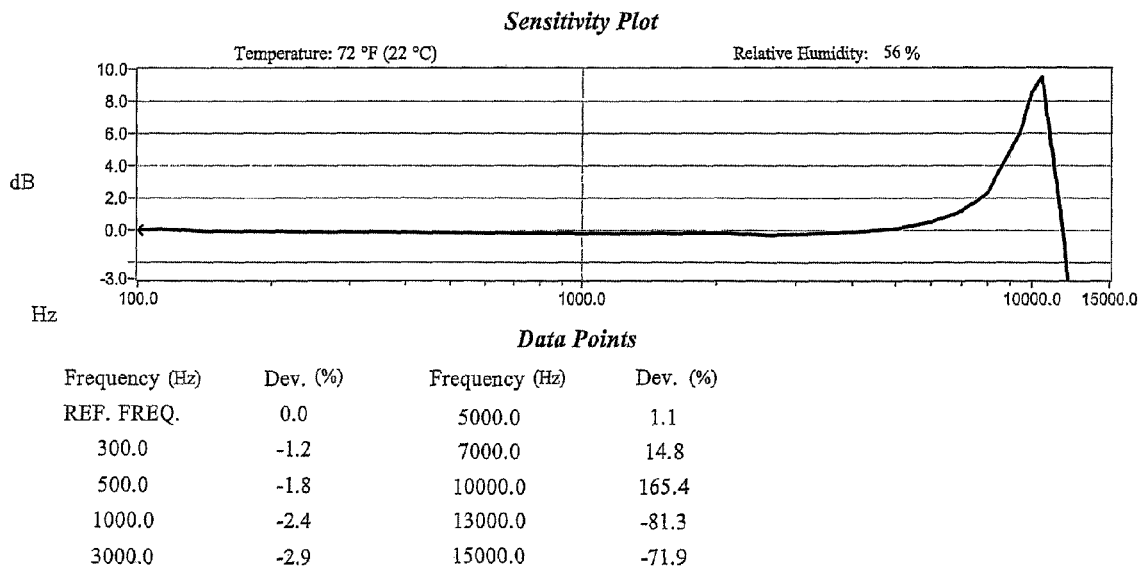
FIG. 8 is an example of frequency response of a prior art sensor.

A vibration sensor mass value limits the range of measured vibration frequencies by the natural (resonance) frequency of the sensor itself. Such an instance is illustrated by FIGS. 6, 7 and 8. In FIG. 6, a plot of normalized natural frequency vs. base and sensitive element mass ratio is presented [curves 40, 41]. Natural frequency may decrease approximately 2-3 times, for example, if the mass of the base is high. The high mass of the base compared with the mass of the sensitive element is typical for industrial applications where bulky connectors, armor or conduits are required, or for wireless sensors where the battery package increases the sensor base mass. The plots in FIGS. 7 and 8 illustrate examples of experimental frequency response taken for two prior art identical sensors with different base masses. FIG. 7 is taken from a sensor with base mass of 114.5 g, and FIG. 8 shows a lower resonance frequency, taken from the same sensor with a higher base mass of 222.9 g.

Figure 9:
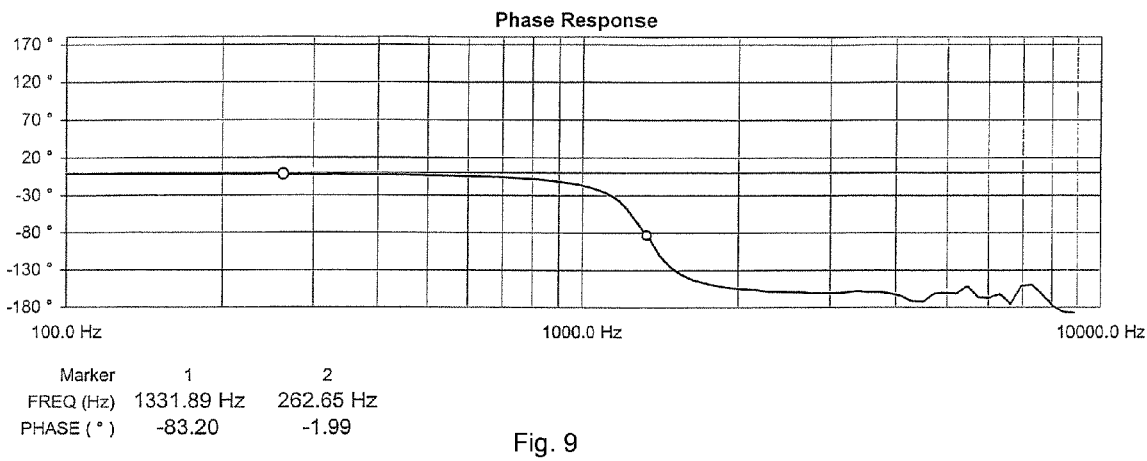
FIG. 9 is an example of phase-frequency responses of a mechanical isolation member.
Figure 10:
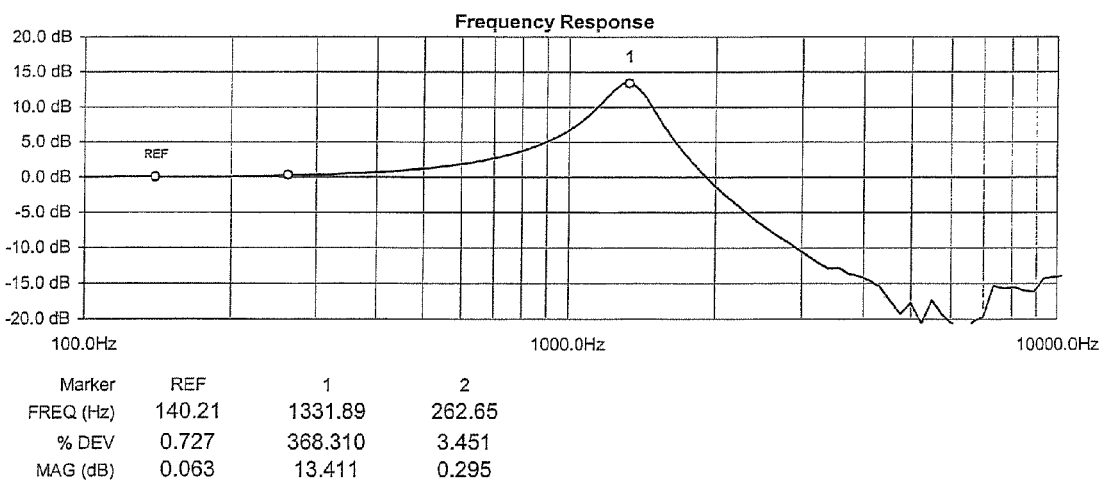
FIG. 10 is an example of amplitude-frequency responses of a mechanical isolation member.

The vibration sensor in accordance with the present invention comprises the described mechanical isolation member 14. Example phase-frequency and amplitude-frequency responses for a mechanical isolation member itself are shown at FIGS. 9 and 10.

Figure 11:
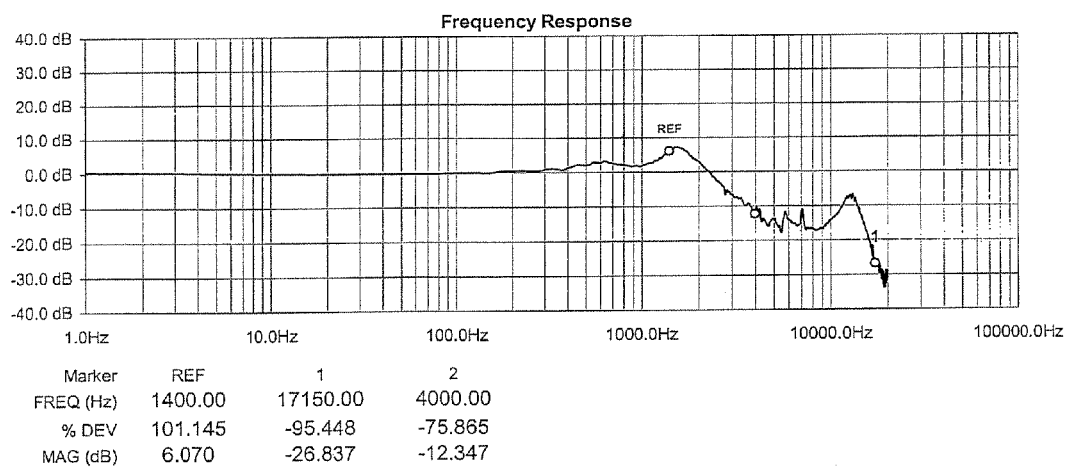
FIG. 11 is an example of vibration vs. frequency measured at the main body portion of an embodiment of a vibration sensor with mechanical isolation member.
Figure 12:
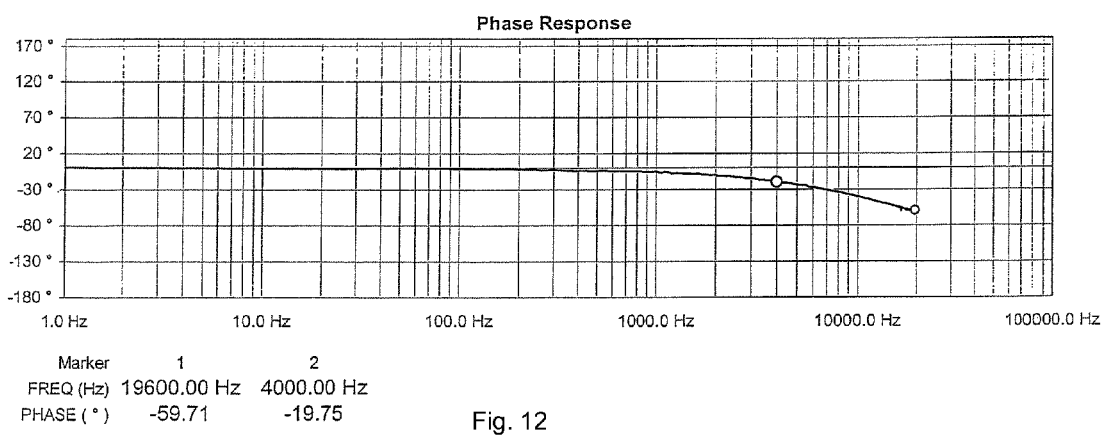
FIG. 12 is an example of the phase-frequency response measured in a range through 20 kHz at the output of an embodiment of a vibration sensor with mechanical isolation member.
Figures 13, 14:
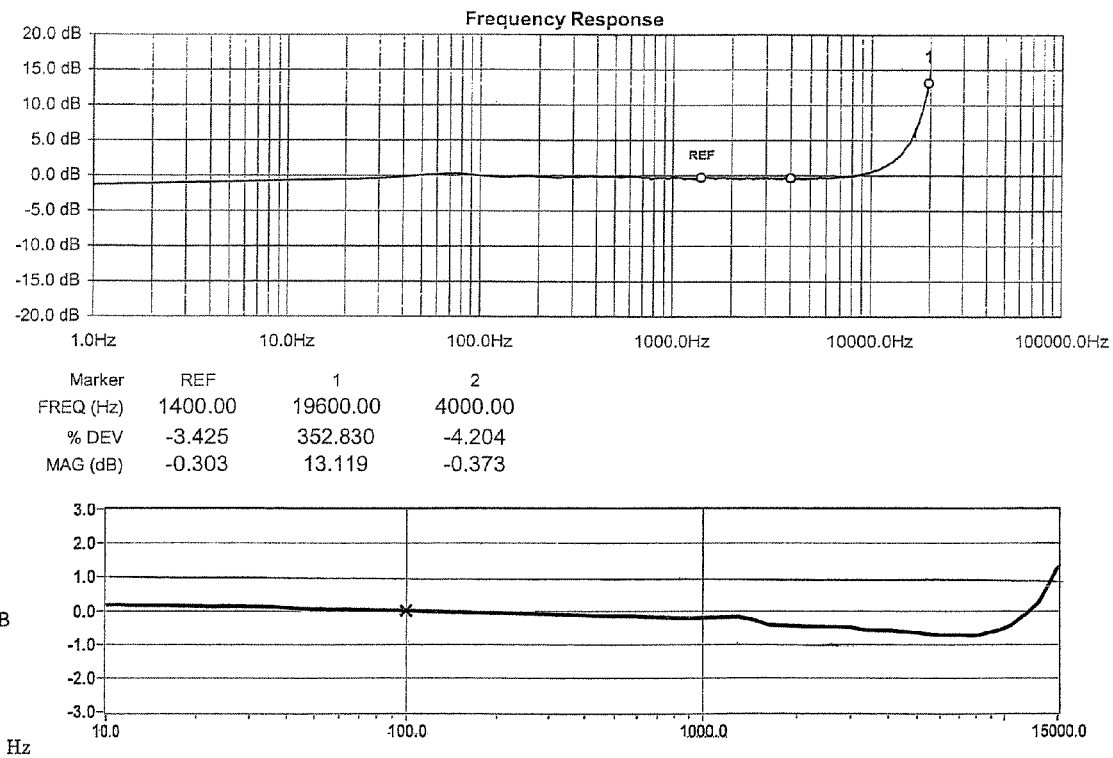
FIG. 13 is an example of the amplitude-frequency response presented in a plot ±20 dB and measured in a range through 20 kHz at the output of an embodiment of a vibration sensor with mechanical isolation member.
FIG. 14 is an example of the amplitude-frequency response presented in a plot ±3 dB and measured in a range through 15 kHz at the output of an embodiment of a vibration sensor with mechanical isolation member.

The insertion of a mechanical isolation member 14 between a relatively light mass sensor base 15 with a sensitivity element 19 and the main sensor body 11 provides a higher natural (resonance) frequency than an equivalent assembly without the mechanical isolation member. This is illustrated in FIGS. 12, 13 and 14, which include examples of frequency responses of a vibration sensor with a total mass over 300 g and having a mechanical isolation member 14. FIG. 14 illustrates a high cutoff frequency greater than 15 kHz, which is higher than a traditional sensor without a mechanical isolation member. The vibration sensor with mechanical isolation member may extend the frequency response as high as 20 kHz, for example. Additionally, the mechanical isolation member 14 provides a reduction of the vibration levels of electronics parts and battery packages. This is illustrated in FIG. 11, where the vibration level of the electronic parts of the vibration sensor is shown.

Figure 15:
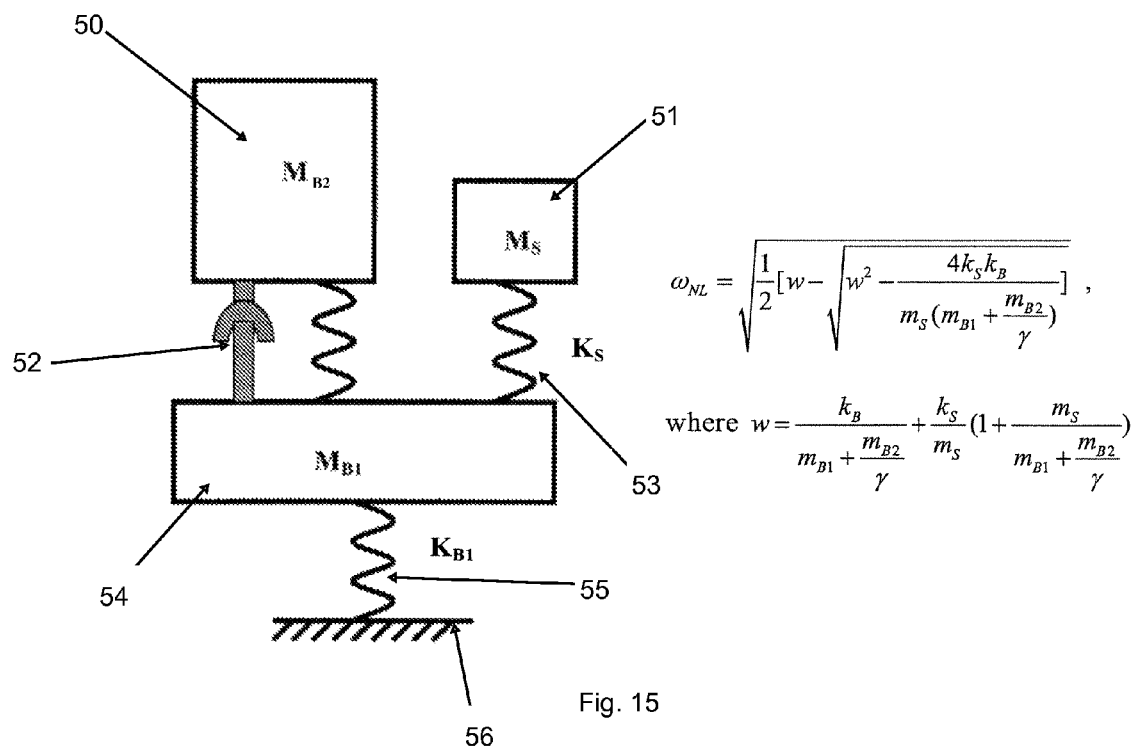
FIG. 15 is a schematic drawing of a model mass-spring system.

The physics of a vibration sensor mounted on machinery surface 56 in accordance with one embodiment of the invention may be represented or approximated by the mass-spring model of FIG. 15. With a mechanical isolation member, the sensor body may be represented by two masses 50 and 51. The mechanical isolation member 52 reduces the vibration at sensor natural frequency, for example by about −20 dB at 15 kHz (see, e.g., FIG. 11).

The frequency range detectable by the vibration sensor in one embodiment is limited by the first resonance (natural) frequency of the mounted sensor, which may be determined by the following approximate formula:

$$\omega_{NL} = \sqrt{\frac{1}{2}\left[w - \sqrt{w^2 - \frac{4k_S k_B}{m_S\left(m_{B1} + \frac{m_{B2}}{\gamma}\right)}}\right]} \text{ where}$$

$$w = \frac{k_B}{m_{B1} + \frac{m_{B2}}{\gamma}} + \frac{k_S}{m_S}\left(1 + \frac{m_S}{m_{B1} + \frac{m_{B2}}{\gamma}}\right),$$

and, with reference to FIG. 15,
$\omega_{NL}$ is smallest natural (resonance) frequency of the vibration sensor;

$k_S$ is stiffness of the junction 53 between sensitive element 51 and base 54;
$k_B$ is stiffness of the junction 55 between sensor base 54 and machinery surface 56;
$m_S$ is sensitive element 56 mass;
$m_{B1}$ is sensor base 54 mass;
$m_{B2}$ is main sensor body 50 mass; and
$\gamma$ is the coefficient of reduction a vibration at frequency $\omega_{NL}$ by described mechanical isolation member.

Usually $\omega^{NL}/2\pi > 10$ kHz$\gg$(700 . . . 1300) Hz, and then $\gamma \gg 1$. Therefore, the natural frequency $\omega_{NL}$ and the sensor frequency response with mechanical isolation member described in the invention became higher, as in the example plots discussed above.

The vibration sensor may be used to monitor and measure vibration in motors, pumps and fans, for example. In addition, because of its working frequency range, some embodiments may also be used to monitor and measure vibration in gearboxes, compressors, turbo-machinery and high-speed spindles, for example.

High frequency vibration measurement provides useful information respecting the onset of malfunction in machinery parts, for example. With this information, potential problems may be detected and fixed before they become major problems.

Figure 24:
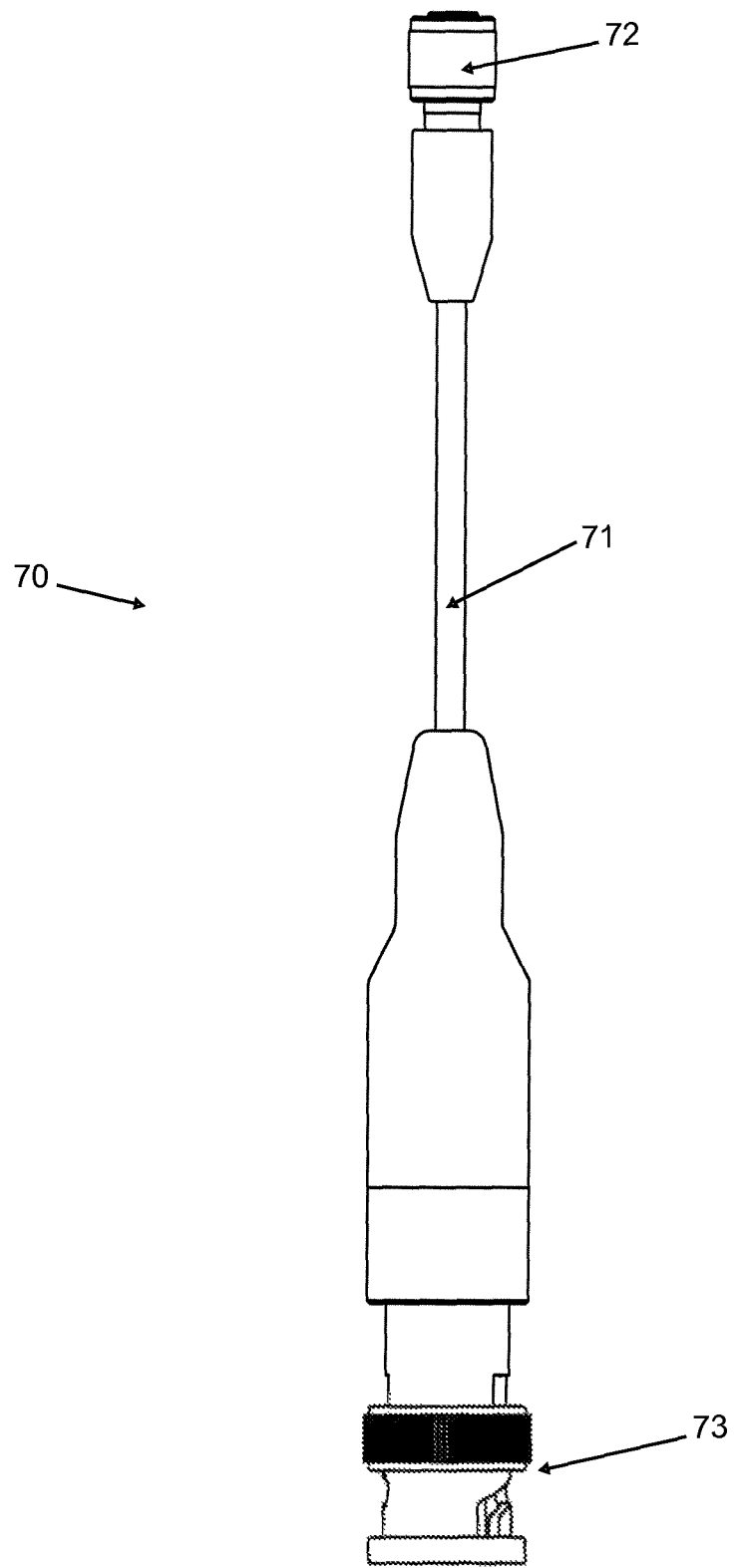
FIG. 24 is a front view of an adapter assembly for use with a vibration sensor.
Figure 25:
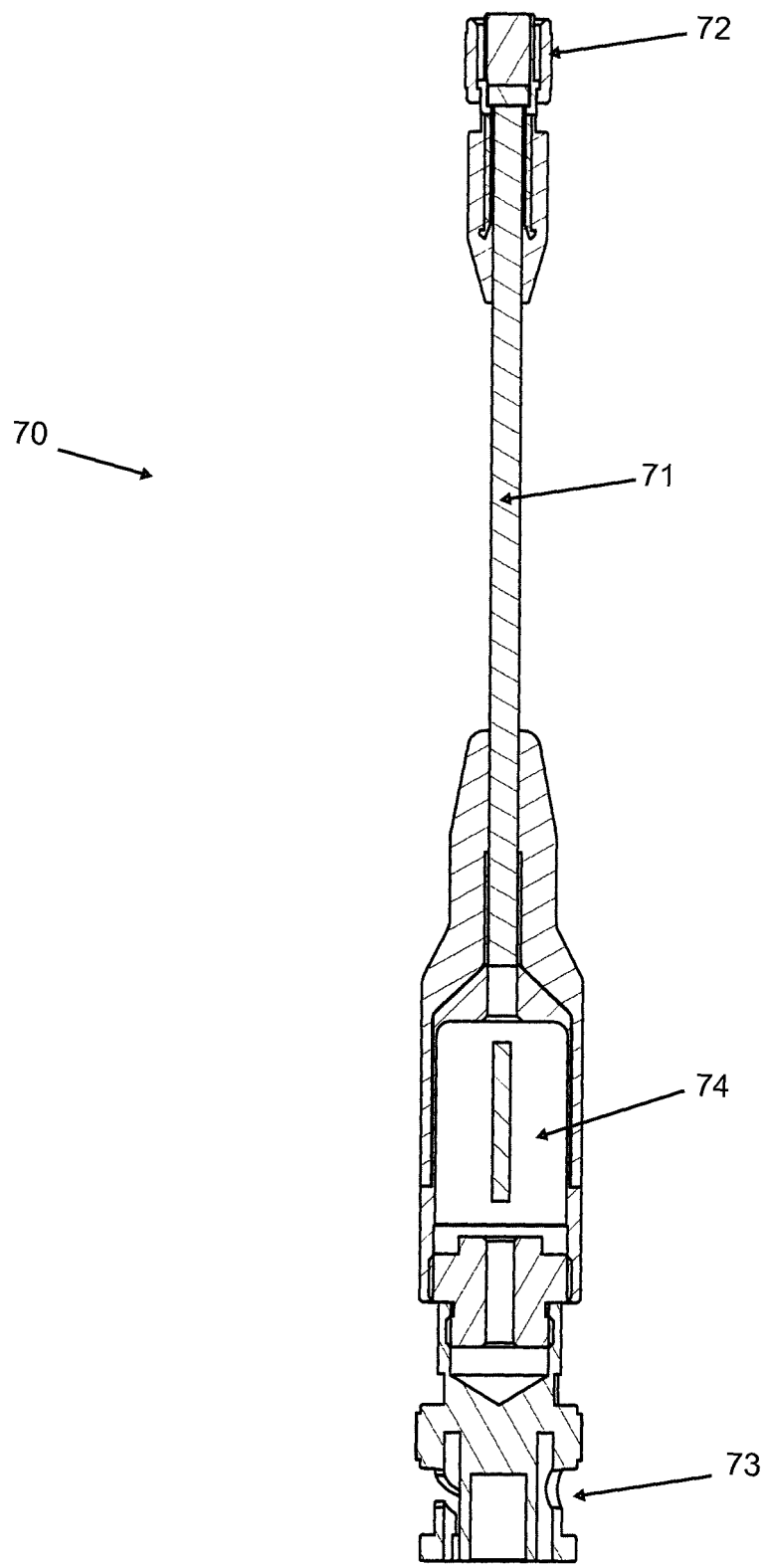
FIG. 25 is a cross-sectional view of the adapter assembly of FIG. 24.

FIG. 24 shows an adapter assembly 70 comprising an adapter cable 71 for connection to a vibration sensor. The adapter cable permits the use of a sensitive element in the vibration sensor operating at low voltage (e.g. 5V) and a built in constant current 24V power supply (for example). At one end, a connector 72 is provided for communication with and connection to the vibration sensor, and at the other end a connector 73 is provided for communication with and connection to an external instrument/data collector. In one embodiment, the adapter assembly is configured for use with a data collector having ICP input (one line which shares power and signal: power by constant current and signal by variable voltage). In another aspect, the adapter assembly receives input from two separate lines (e.g. 5 VDC power and 100 mV/g signal). FIG. 25 is a cross-sectional view of FIG. 24 which further shows the location of the adapter electronics 74.

The new vibration sensor and system is not limited to the foregoing embodiments. Those skilled in the art will recognize that other and further changes and modifications may be made thereto without departing from the spirit of the invention and design. Therefore, the apparatus, system and invention are not limited to the specific details and representative embodiments shown and described herein. In addition, the terminology and phraseology used herein is for purposes of description and should not be regarded as limiting.

What is claimed is:

1. A vibration sensor for measuring vibration in a machine, said vibration sensor comprising:
    a sensor base configured for mounting on a machine, said sensor base comprising a sensitive element for measuring vibration of said machine;
    a main sensor body;
    a mechanical isolation member interposed between said sensor base and said main sensor body, arranged such that said sensor base is not in direct contact with said main sensor body; and
    an electrical assembly within said main sensor body for processing said measured vibration of said machine.

2. The vibration sensor of claim 1, wherein said mechanical isolation member comprises plastic, rubber or polyurethane.

3. The vibration sensor of claim 1, wherein said mechanical isolation member is compressed between said sensor base and said main sensor body.

4. The vibration sensor of claim 1, wherein said mechanical isolation member itself has a fraction of critical damping in a range of about 0.05 to 0.5.

5. The vibration sensor of claim 1, wherein said mechanical isolation member is a coaxial cylinder.

6. The vibration sensor of claim 1, further comprising:
a transmission element for communicating information respecting said measured vibration of said machine to an external processing device.

7. The vibration sensor of claim 1, wherein said electrical assembly is configured to process said measured vibrations in a working frequency range greater than 10 kHz.

8. The vibration sensor of claim 1, wherein said mechanical isolation member is attached to said sensor base such that said mechanical isolation member has high cross-axis stiffness.

9. The vibration sensor of claim 1, further comprising:
an adapter assembly in communication with said main sensor body, configured for connection to an external data collector.

10. The vibration sensor of claim 1, further comprising:
an antenna within said main sensor body configured for wireless transmission of information respecting said measured vibration,
wherein said main sensor body comprises a plastic cap.

11. The vibration sensor of claim 1, wherein said mechanical isolation member has a natural frequency in a range of about 700 Hz to 1300 Hz.

12. A vibration sensing system for measuring vibration in a machine, said vibration sensing system comprising:
a sensor base configured for mounting on a machine, said sensor base comprising a sensitive element for measuring vibration of said machine;
a main sensor body;
a mechanical isolation member interposed between said sensor base and said main sensor body, arranged such that said sensor base is not in direct contact with said main sensor body;
an electrical assembly within said main sensor body for processing said measured vibration of said machine;
wherein said main sensor body comprises a transmission element for transmission of information respecting said measured vibration of said machine.

13. The vibration sensing system of claim 12, wherein said transmission element is a connector, further comprising:
an adapter cable assembly comprising an electrical conductor configured for communication between said connector and an external data collector.

14. The vibration sensing system of claim 12, wherein said transmission element is an antenna configured for wireless transmission of information respecting said measured vibration of said machine, and said main sensor body comprises a plastic cap.

15. The vibration sensing system of claim 12, wherein said mechanical isolation member comprises plastic, rubber or polyurethane.

16. The vibration sensing system of claim 12, wherein said mechanical isolation member is compressed between said sensor base and said main sensor body.

17. The vibration sensing system of claim 12, wherein said mechanical isolation member has a natural frequency in a range of about 700 Hz to 1300 Hz.

18. The vibration sensing system of claim 12, wherein said mechanical isolation member itself has a fraction of critical damping in a range of about 0.05 to 0.5.

19. The vibration sensing system of claim 12, wherein said mechanical isolation member is a coaxial cylinder.

20. A vibration sensor for measuring vibration in a machine for operation at a selected working frequency greater than 10 kHz, said vibration sensor comprising:
a sensor base configured for mounting on a machine, said sensor base comprising a sensitive element for measuring vibration of said machine;
a main sensor body;
a mechanical isolation member interposed between said sensor base and said main sensor body, arranged such that said sensor base is not in direct contact with said main sensor body;
means for processing said measured vibration of said machine; and
means for transmitting information respecting said measured vibration of said machine to an external processing device.

21. The vibration sensing system of claim 20, wherein said mechanical isolation member comprises plastic, rubber or polyurethane.

22. The vibration sensing system of claim 20, wherein said mechanical isolation member is compressed between said sensor base and said main sensor body.

23. The vibration sensing system of claim 20, wherein said mechanical isolation member has a natural frequency in a range of about 700 Hz to 1300 Hz.

24. The vibration sensing system of claim 20, wherein said mechanical isolation member itself has a fraction of critical damping in a range of about 0.05 to 0.5.

25. The vibration sensing system of claim 20, wherein said mechanical isolation member is a coaxial cylinder.

* * * * *